(12) United States Patent
Wu et al.

(10) Patent No.: US 7,073,952 B2
(45) Date of Patent: Jul. 11, 2006

(54) STABLE MECHANICAL DEVICES FOR PRECISION OPTICAL ALIGNMENT AND PACKAGING

(75) Inventors: Frank Xi Wu, Fremont, CA (US); Jian Xu, Pleasanton, CA (US); Ming Li, Pleasanton, CA (US); Song Peng, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 120 days.

(21) Appl. No.: 10/163,405

(22) Filed: Jun. 5, 2002

(65) Prior Publication Data

US 2002/0179792 A1 Dec. 5, 2002

Related U.S. Application Data

(60) Provisional application No. 60/296,070, filed on Jun. 5, 2001.

(51) Int. Cl.
*G02B 6/26* (2006.01)
*G02B 7/00* (2006.01)

(52) U.S. Cl. .......................... 385/62; 385/90; 385/28; 359/896; 248/288.31

(58) Field of Classification Search .............. 248/55, 248/65, 74.1, 74.4, 230.5, 231.61, 316.6, 248/288.31, 580, 540, 541; 211/60.1; 362/191, 362/72, 190; 385/61, 33, 52, 90, 88, 92, 385/93
See application file for complete search history.

(56) References Cited

U.S. PATENT DOCUMENTS

| | | | | |
|---|---|---|---|---|
| 2,431,476 A | * | 11/1947 | Hall ........................... 279/16 |
| 3,519,236 A | * | 7/1970 | Schmidt et al. .......... 248/181.1 |
| 3,539,234 A | * | 11/1970 | Rapata ....................... 384/203 |
| 3,588,232 A | * | 6/1971 | Mostel ........................ 359/873 |
| 3,627,339 A | * | 12/1971 | Burweger ...................... 279/8 |
| 4,183,618 A | * | 1/1980 | Rush et al. .................... 385/79 |
| 4,303,301 A | * | 12/1981 | Teichert et al. ............... 385/75 |
| 4,472,797 A | * | 9/1984 | Nicia .......................... 398/43 |
| 4,807,861 A | * | 2/1989 | Kimball ....................... 269/75 |
| 4,815,812 A | * | 3/1989 | Miller ......................... 385/61 |
| 4,980,805 A | * | 12/1990 | Maglica et al. ............. 362/191 |
| 5,062,026 A | * | 10/1991 | Maglica et al. ............. 362/191 |
| 5,095,517 A | * | 3/1992 | Monguzzi et al. ............ 385/90 |
| 5,109,321 A | * | 4/1992 | Maglica et al. ............. 362/191 |
| 5,128,841 A | * | 7/1992 | Maglica et al. ............. 362/191 |
| 5,184,884 A | * | 2/1993 | Maglica et al. ............. 362/191 |
| 5,195,707 A | * | 3/1993 | Ignatuk et al. ........... 248/179.1 |
| 5,212,749 A | * | 5/1993 | Huggins et al. .............. 385/62 |
| 5,270,911 A | * | 12/1993 | Maglica et al. ............. 362/396 |

(Continued)

*Primary Examiner*—Anita M. King
*Assistant Examiner*—Naschica S Morrison
(74) *Attorney, Agent, or Firm*—Patterson & Sheridan

(57) ABSTRACT

An optical alignment device holds fiber collimators in place with extremely good mechanical and environmental stability. The device includes a ball with a hole traversing the ball, an upper clamping block with a first inner concave spherical surface and a lower clamping block with a second inner concave spherical surface. The hole includes a shape that can accommodate or contact an optical component whose alignment is to be controlled. The ball, together with the enclosed optical component is firmly held between the first and second inner concave surfaces of the clamping blocks, which are tightened against the ball with screws. When firmly clamped within the concave surfaces, the ball is prevented from accidental movement but can still rotate about any axis to align the optical component. Once alignment is achieved, the optical component and the ball are secured in place by epoxy, glue, solder or other suitable adhesive.

14 Claims, 6 Drawing Sheets

U.S. PATENT DOCUMENTS

| | | |
|---|---|---|
| 5,515,246 A * | 5/1996 | Maglica ................... 362/473 |
| 5,638,472 A * | 6/1997 | Van Delden ............... 385/33 |
| 5,660,363 A * | 8/1997 | Maglica ................ 248/288.31 |
| 5,667,185 A * | 9/1997 | Maglica ................... 248/541 |
| 5,860,728 A * | 1/1999 | Maglica ................... 362/191 |
| 5,863,018 A * | 1/1999 | Allen et al. ............. 248/176.1 |
| 5,901,753 A * | 5/1999 | Ziu ......................... 138/113 |
| 5,937,123 A * | 8/1999 | Frelier ..................... 385/79 |
| 6,170,795 B1 * | 1/2001 | Wayne ..................... 248/664 |
| 6,173,106 B1 * | 1/2001 | DeBoynton et al. ........ 385/140 |
| 6,384,993 B1 * | 5/2002 | Bell et al. .................. 359/896 |
| 6,519,101 B1 * | 2/2003 | Bell et al. .................. 359/896 |
| 6,561,471 B1 * | 5/2003 | Hawie ..................... 248/201 |
| 6,570,721 B1 * | 5/2003 | Wayne et al. ............. 359/819 |
| 6,709,169 B1 * | 3/2004 | Rossi ........................ 385/92 |
| 2001/0020668 A1 * | 9/2001 | Thomas et al. .......... 248/309.3 |
| 2002/0179792 A1 * | 12/2002 | Wu et al. ............. 248/288.31 |
| 2003/0095755 A1 * | 5/2003 | Vaganov et al. ............. 385/88 |

\* cited by examiner

000
STABLE MECHANICAL DEVICES FOR PRECISION OPTICAL ALIGNMENT AND PACKAGING

CROSS-REFERENCE TO RELATED APPLICATIONS

This application claims priority from U.S. Provisional Patent Application Ser. No. 60/296,070, entitled "Stable Mechanical Devices for Precision Optical Alignment and Packaging," filed on Jun. 5, 2001.

FIELD OF THE INVENTION

The present invention relates to devices utilized for alignment of optical components. More particularly, the present invention relates to such devices utilized with fiber-optic light transmission systems.

BACKGROUND OF THE INVENTION

In optical systems, it is often necessary to align two or more components with high angular and positional precision. Conventional techniques based upon push and pull with screws are mechanically and environmentally unstable. These techniques also yield bulky devices. In many applications, such as fiber optic components, very stringent mechanical stability is required over long periods of time (20 years) and wide temperature (−40C to +85C), humidity (5% to 85% relative) range. In addition, for fiber optic components, the form factor must be small, typically device thickness must be less then 20 mm. These requirements demand new alignment and packaging designs that are both stable and compact.

In fiber optic component fabrication, a common task is to align input and output fiber collimators so that light from an input fiber can be coupled into an output fiber as illustrated in the system 100 shown in FIG. 1. An input fiber 102a outputs a diverging light 103. The diverging light is intercepted by a first lens 104a that performs as a collimator lens. Therefore, after passing through the first lens 104a, the light 103 is a collimated light. The collimated light 103 may interact with or pass through a filter or other optical device (not shown) to modulate or change some property of the light in some desired fashion. The collimated light 103 is then focused to a small spot 105 by a second lens 104b. The spot 105 lies essentially at the "focal point" of the second lens 104b. An output fiber 102b is, ideally, positioned with its end face precisely at the spot 105 so as to receive the light 103 and carry it out of the system 100. The second lens 104b may also be referred to as a "collimator" lens, despite the fact that if performs a focusing function, by virtue of the fact that it is generally physically identical to the collimator lens 104a.

The most critical degrees of freedom during alignment of the system 100 are the aiming of the collimators 104a–104b, i.e., the angular alignment of the collimators about the y- and z-axes. For instance, in FIG. 1, the collimator lens 104a is shown with a slight angular misalignment caused by a slight rotation of the lens 104a about the y-axis, which is perpendicular to the plane of the drawing of FIG. 1. The misalignment of the collimator lens 104a causes slight angular offset of the collimated light 103 such that, after this light is focused by the second lens 104b, the focal spot 105 does not lie at the correct position at the end face of the output fiber 102b. Even if the output fiber 102b is translated so that the end face lies at the mis-located spot 105, a significant proportion of the light 103 is still prevented from entering the output fiber 102b, since the light does not enter the fiber parallel to its length.

Accordingly, there exists a need for an improved optical alignment device. The optical alignment device must be able to accurately control the aiming of collimators or other optical components, have mechanical stability, and be not significantly larger than the optical component. The present invention addresses such a need.

SUMMARY OF THE INVENTION

An optical alignment device holds fiber collimators in place with extremely good mechanical and environmental stability. The device includes a ball with a hole traversing the ball, an upper clamping block with a first inner concave spherical surface and a lower clamping block with a second inner concave spherical surface. The hole includes a shape that can accommodate or contact an optical component whose alignment is to be controlled. The ball, together with the enclosed optical component is firmly held between the first and second inner concave surfaces of the clamping blocks, which are tightened against the ball with screws. When firmly clamped within the concave surfaces, the ball is prevented from accidental movement but can still rotate about any axis to align the optical component. Once alignment is achieved, the optical component and the ball are secured in place by epoxy, glue, solder or other suitable adhesive.

DETAILED DESCRIPTION

The present invention provides an improved optical alignment device. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
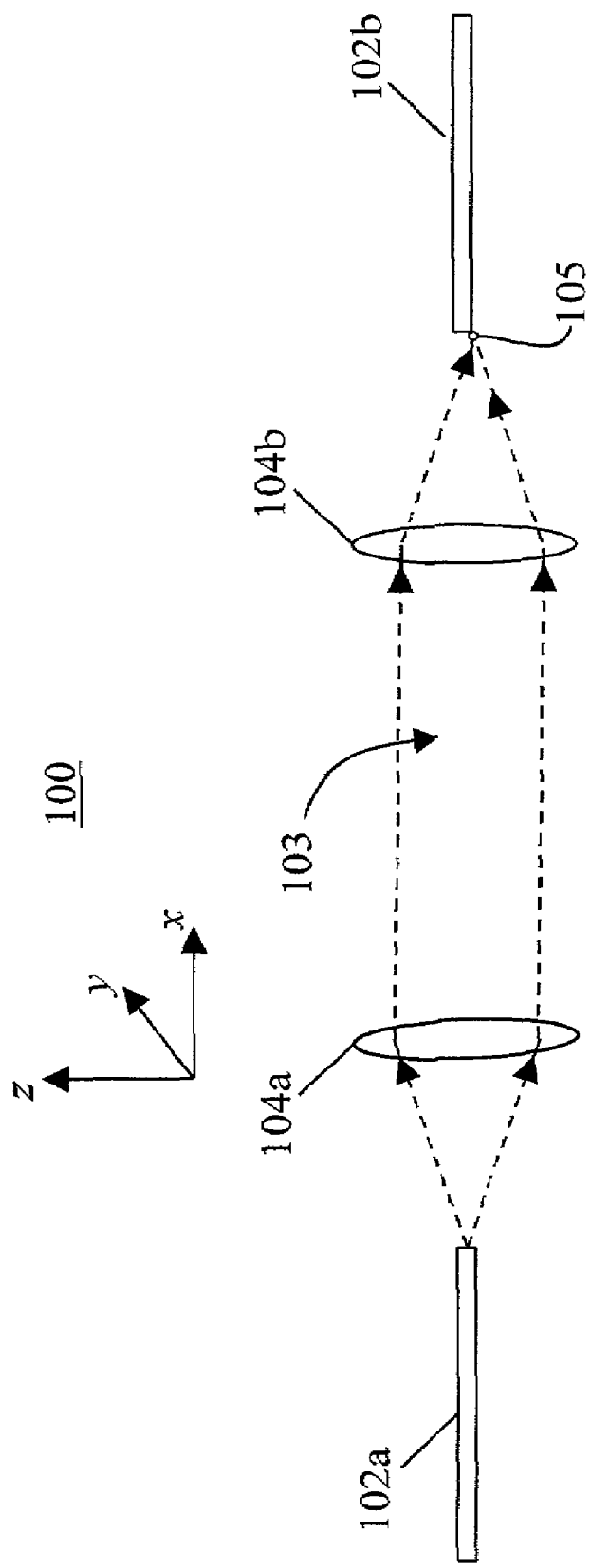
FIG. 1 is an illustration of a conventional fiber-optic system.
Figure 2A:
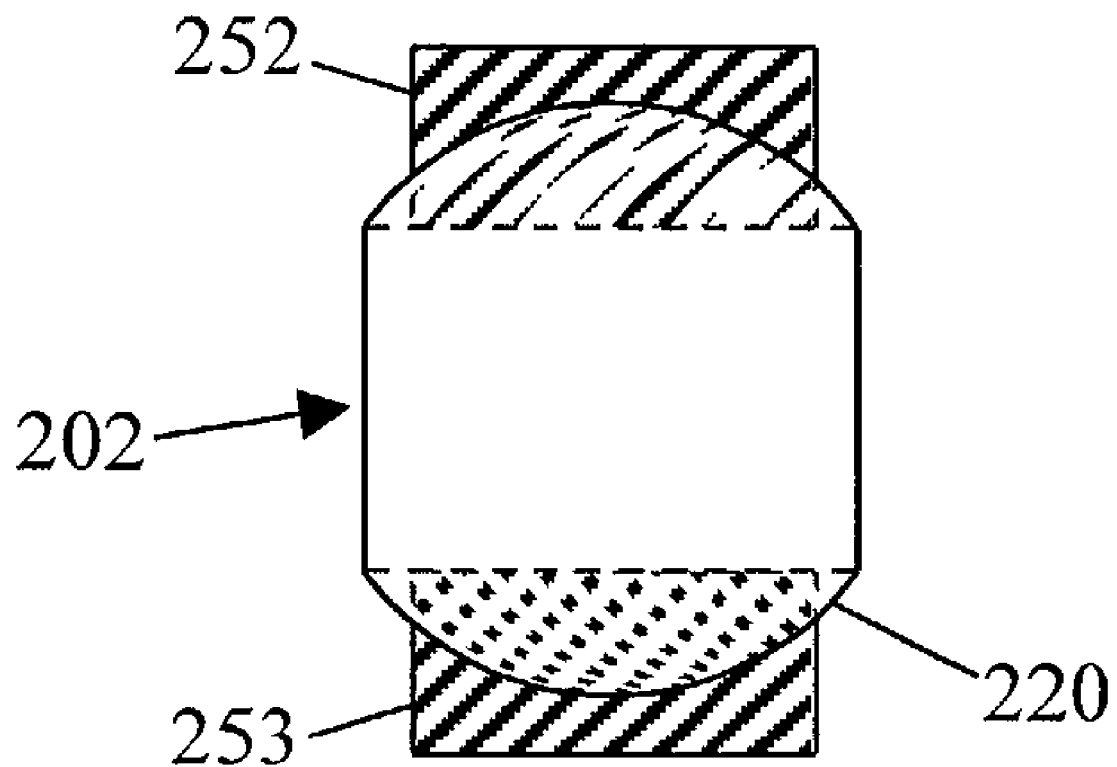
FIG. 2A is an illustration of a preferred embodiment of an optical alignment device in accordance with the present invention.
Figure 2B:
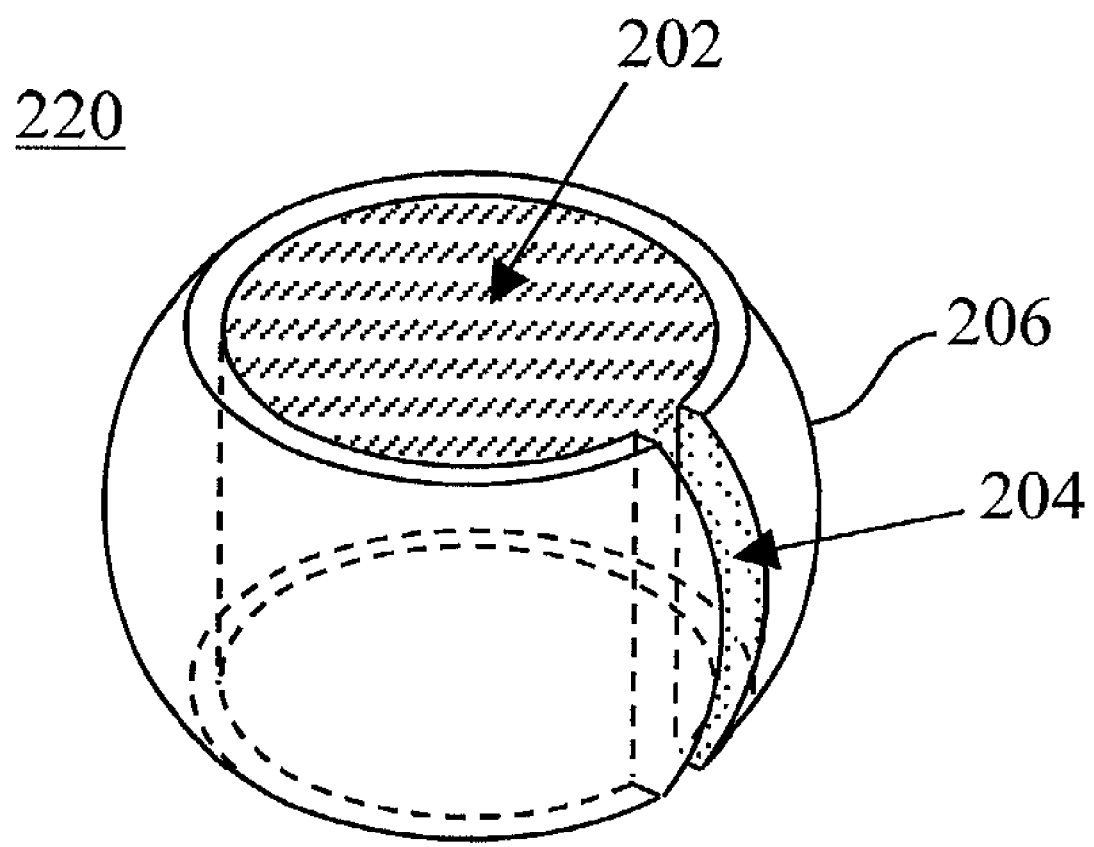
FIG. 2B is an illustration of a compression ball as utilized within the preferred embodiment of an optical alignment device in accordance with the present invention.
Figure 2C:
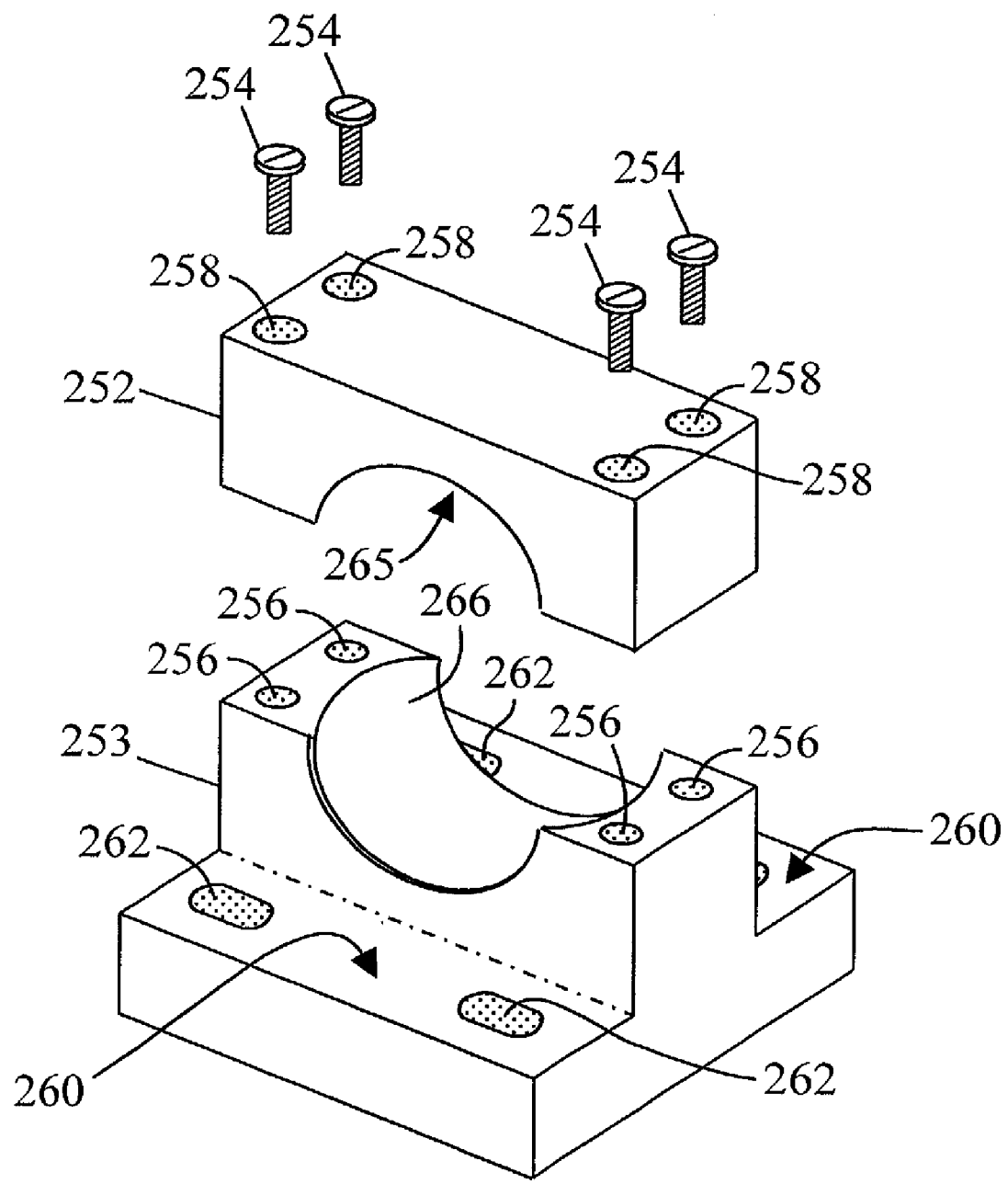
FIG. 2C is an illustration of upper and lower clamping blocks as utilized within the preferred embodiment of an optical alignment device in accordance with the present invention.

To more particularly describe the features of the present invention, please refer to FIGS. 2A through 3B in conjunction with the discussion below. FIG. 2A is a drawing of a preferred embodiment of an optical alignment device in accordance with the present invention. As illustrated in FIG. 2A, the optical alignment device 200 comprises a ball 220 with a central hole 202, an upper clamping block 252 and a lower clamping block 253. FIG. 2B shows the ball 220 in greater detail and FIG. 2C shows both the clamping blocks 252–253 in greater detail.

The ball 220 shown in FIG. 2B comprises an outer convex surface 206 that, preferably, is a portion of a sphere. The central hole 202 is of a shape that can contact or be utilized to mount a particular optical component whose alignment is to be adjusted by the inventive device. In the examples shown herein, the optical alignment device 200 is utilized to align a cylindrical rod collimating lens, such as a "GRIN" lens and, thus, the central hole 202 is cylindrical in shape. However, other optical components, such as mirrors, diffraction gratings, and lasers can also be positioned with the above described device. The incorporation of such devices may require a non-cylindrical central hole.

The ball 220 further comprises a slot 204 that causes the ball 220 to have an open ring structure. The provision of the slot 204 may permit the ball 220 to compress slightly upon application of pressure so as to tightly grasp the optical component contained within the central hole 202. The provision of the slot 204 may further permit the ball 220 to expand slightly to admit an optical component whose cylindrical radius is greater than or equal to that of the central hole.

The clamping structure shown in FIG. 2B comprises the upper clamping block 252 and the lower clamping block 253 that are bolted together with screws 254. Accordingly, the upper clamping block 252 comprises a set of clearance holes 258 through which the screws 254 pass and the lower clamping block 253 comprises a set of tapped holes 256 into which the screws 254 are threaded. Alternatively, the clearance holes 258 could be drilled within the lower block 253 and the tapped holes 256 could be drilled within the upper block 252. Optionally, the lower clamping block 253 may comprise basal ledges 260 extending away from a second concave surface 266 in the lower clamping block 253, wherein a second set of clearance holes or slots 262 are drilled through the ledges. The ledges 260 with the clearance holes or slots 262 facilitate attachment of the apparatus to any housing, bench, or other surface or structure by passing screws through the clearance holes 262. If the clearance holes 262 are in the shape of slots, this permits translational adjustment of the lower clamping block 253 relative to a surface or structure upon which is it mounted.

The ball 220, which is not shown in FIG. 2C, is clamped between the upper and lower clamping blocks 252–253. The upper clamping block 252 comprises a first concave surface 265 that closely abuts against the convex surface 206 of the ball 220. The lower clamping block 253 comprises a second concave surface 266 that also closely abuts against the convex surface 206. Preferably, the first concave surface 265 comprises a portion of a sphere and the second concave surface 266 comprises a portion of a sphere. Preferably, the sphere defining the surface 265 comprises the same radius as the sphere defining the surface 266. The tightening of the screws 254 applies pressure against the ball 220 that firmly holds the ball in place against accidental movement whilst still permitting the ball 220 to be physically rotated about any axis for adjustment or alignment purposes.

During adjustment or alignment, the convex surface 206 slides against the two concave surfaces 265–266. Preferably, assembly of the two clamping blocks 252–253 together with the ball 220 between them causes substantial coincidence between the centers of the three preferably spherical surfaces 206, 265 and 266. In this case, rotation of the ball 220 may be readily accomplished without any associated translation of the ball 220.

A method for assembling and aligning the apparatus 200 together with an optical component is now described. This discussion assumes that the optical component comprises a cylindrically shaped component, such as a GRIN lens collimator. First, the cylindrical component is inserted into the cylindrical hole 202 of the ball 220 and affixed to the ball 220 either by glue, epoxy, solder, or some other suitable adhesive. Then, the ball 220, together with the enclosed optical component, is placed in between the upper clamping block 252 and the lower clamping block 253. Next, the upper and lower blocks 252–253 are fastened together with screws 254 so that the ball 220 is firmly held in between the blocks 252–253, while still remaining moveable. Next, the direction or aiming of the collimator is adjusted by rotating the ball 220 within the clamping blocks 252–253 using any external alignment mechanism (not shown). Finally, the external alignment mechanism or mechanisms are removed and the collimator stays aligned because of the pressure applied against the ball 220 by the clamping blocks 252–253. Additional gluing, soldering, etc. can then be performed to reinforce the alignment. Alternatively, glue may be applied between the ball 220 and the sphere structure during assembly and subsequently cured after alignment.

Figure 3A:
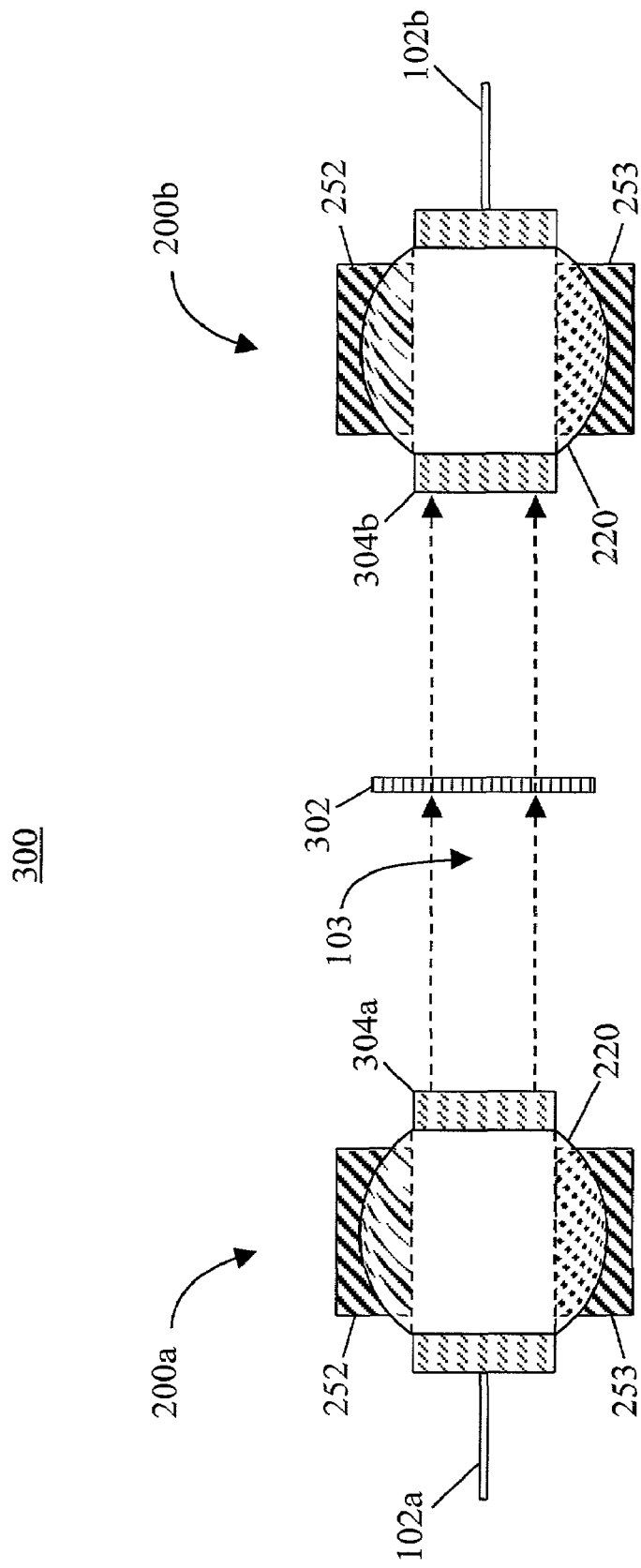
FIG. 3A is an illustration of a first fiber-optic system that utilizes an optical alignment device in accordance with the present invention.
Figure 3B:
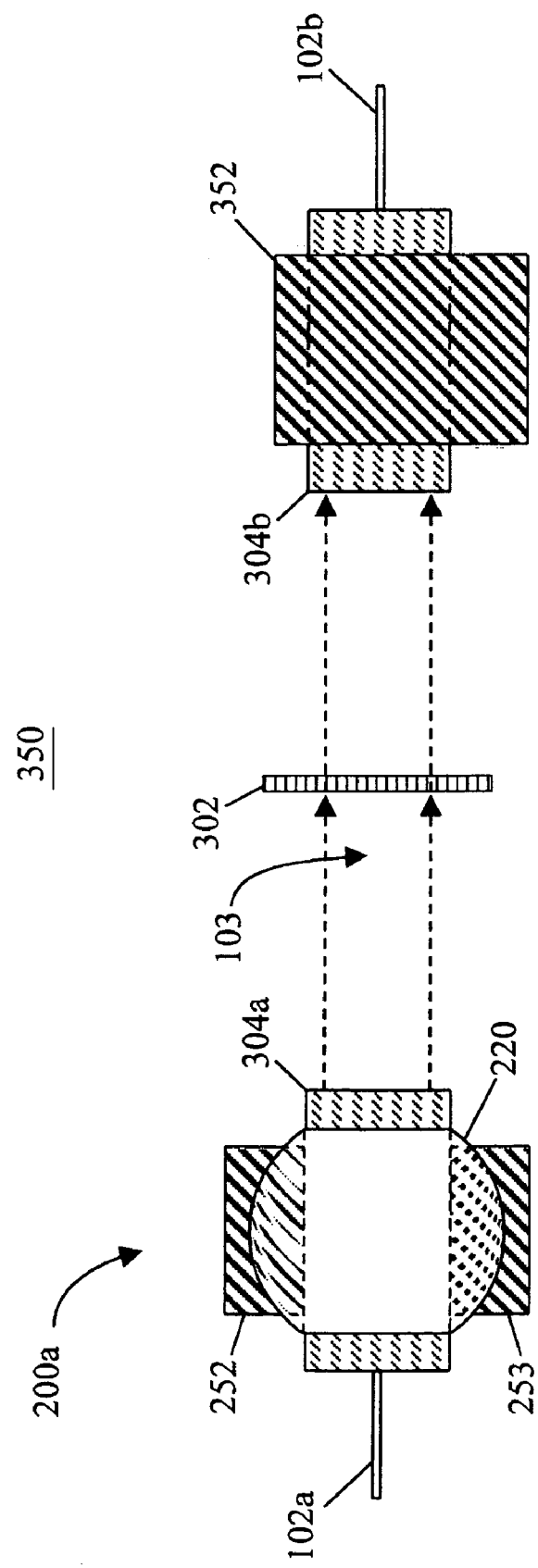
FIG. 3B is an illustration of a second fiber-optic system that utilizes an optical alignment device in accordance with the present invention.

FIG. 3A is an illustration of a first fiber-optic system 300 that utilizes an optical alignment device in accordance with the present invention. A first GRIN lens fiber-optic collimator 304a is housed within the cylindrical hole 202 of the ball 220 comprising a first optical alignment device 200a. The first optical alignment device 200a further comprises an upper clamping block 252 and a lower clamping block 253 as previously described. The first GRIN lens fiber-optic collimator 304a receives input light 103 from an input optical fiber 102a. This light is collimated by the collimator 304a so as to become a collimated light after passing through this collimator 304a. The collimated light 103 then passes through an optical component 302 such as a thin-film filter, liquid crystal modulator, or optical interferometer. The collimated light 103 then passes into a second GRIN lens fiber-optic collimator 304b, which, in this example, is identical to the collimator 304a but performs a focusing operation instead of a collimating operation. The second collimator 304b focuses the light into an output optical fiber 102b and may be housed within an optional second optical alignment device 200b. The second optical alignment device 200b comprises a ball 220, an upper clamping block 252 and a lower clamping block 253 as previously described.

In the system 300 (FIG. 3A), the angular alignment provided to at least one of the collimators 304a–304b by the respective containing optical alignment device 200a–200b ensures that the collimated light is aimed correctly so as to correctly be focused into the output fiber 102b. Alternatively, the optional second optical alignment device 200b may be replaced by a conventional translation mechanism, such as the moveable housing 352 comprising the alternative system 350 shown in FIG. 3B. In the system 350, the second collimator 304b is affixed to or mounted within or upon the moveable housing 352. In this fashion, the optical alignment device 200a provides angular adjustment whilst the moveable housing 352 provides positional adjustment. Together, the angular adjustment provided by the optical alignment device 200a and the positional adjustment provided by the moveable housing 352 provide a sufficient number of adjustment degrees of freedom to ensure accurate optical coupling of the light 103 into the output fiber 102b.

An improved optical alignment device has been disclosed. The device is able to hold fiber collimators in place with extremely good mechanical and environmental stability. In a preferred embodiment, the device comprises a ball with a hole traversing the ball, an upper clamping block with a first inner concave spherical surface and a lower clamping block with a second inner concave spherical surface. The hole comprises a shape that can accommodate or contact an optical component whose alignment is to be controlled. The ball, together with the enclosed optical component is firmly held between the first and second inner concave surfaces of the clamping blocks, which are tightened against the ball with screws. When firmly clamped within the concave surfaces, the ball is prevented from accidental or incidental movement but can still rotate about any axis to align the optical component. Once alignment is achieved, the optical component and the ball are secured in place by epoxy, glue, solder or other suitable adhesive.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system, comprising:
    a first optical alignment device, comprising:
        a first ball comprising a first hole traversing the first ball,
        a first optical component residing within the first hole and having an optical axis substantially aligned with the first hole, and
        a first clamp, wherein the first ball resides within the first clamp, wherein the first ball is moveable within the first clamp, wherein the first optical component is aligned by moving the first ball, wherein the first clamp further comprises a first clamping block having a first inner surface for abutting the first ball and a second clamping block having a second inner surface for abutting the first ball and further comprising two basal ledges extending away from the second inner surface for securing the second clamping block to a surface, wherein the first and second clamping blocks are coupled together on a first side and a second side of the optical axis with a fastening mechanism;
    a second optical component optically coupled to the first optical component; and
    a second optical alignment device, comprising a third optical component optically coupled to the second optical component at a side opposite to the first optical component.

2. The system of claim 1, wherein the first ball comprises a first convex outer surface.

3. The system of claim 1, wherein the first ball comprises a first slot traversing from a first outer surface of the first ball to the first hole.

4. The system of claim 1, wherein the coupling between the first and second clamping blocks holds the first ball within the first clamp, wherein the ball remains moveable.

5. The system of claim 1, wherein the second optical alignment device comprises:
    a second ball comprising a second hole traversing the second ball;
    the third optical component residing within the second hole, and
    a second clamp, wherein the second ball resides within the second clamp, wherein the second ball is moveable within the second clamp, wherein third optical component is aligned by moving the second ball.

6. The system of claim 5, wherein the second ball comprises a second convex outer surface.

7. The system of claim 5, wherein the second ball comprises a second slot traversing from a second outer surface of the second ball to the second hole.

8. The system of claim 5, wherein the second clamp comprises:
    a third clamping block comprising a third inner surface for abutting the second ball; and a fourth clamping block comprising a fourth inner surface for abutting the second ball.

9. The system of claim 5, wherein the second clamp further comprises:
    a second fastening mechanism for coupling the third and fourth clamping blocks, wherein the coupling holds the second ball within the second clamp, wherein the second ball remains moveable.

10. The system of claim 1, wherein the first ball comprises a first slot traversing from a first end of the first hole to a second end of the first hole.

11. A method for aligning an optical component, comprising the steps of:
    (a) inserting the optical component into a hole in a ball, wherein the hole traverses the ball and the optical component has an optical axis substantially aligned with the hole;
    (b) placing the ball between a first clamping block and a second clamping block, wherein the second clamping block comprises two basal ledges for securing the second clamping block to a surface;
    (c) coupling together the first side and second clamping blocks on a first and a second side of the optical axis with a fastening mechanism, wherein the ball is held between the first and second clamping blocks, wherein the ball remains moveable;
    (d) securing the second clamping block to the surface via the two basal ledges;
    (e) adjusting an alignment of the optical component by moving the ball; and
    (f) affixing the ball to the first and second clamping blocks to reinforce alignment.

12. An apparatus for optical alignment comprising:
    a ball comprising a hole traversing the ball;
    an optical component having an optical axis and residing within the hole such that the optical axis is substantially aligned with the hole, wherein the optical component is optically coupled to an optical fiber, and the optical component is aligned with the optical fiber by moving the ball; and
    a clamp that includes a first clamping block having a first inner surface for abutting the ball and a second clamping block having a second inner surface for abutting the ball, wherein the ball resides between the first and second clamping blocks, and the first and second clamping blocks are coupled together on a first side and second side of the optical axis with a fastening mechanism such that the ball is moveable within the clamp.

13. The apparatus of claim 12, wherein the ball comprises a slot traversing from a first end of the hole to a second end of the hole.

14. A method for aligning an optical component, comprising the steps of:
(a) inserting the optical component into a hole in a ball, wherein the optical component has an optical axis substantially aligned with the hole and the optical component is coupled to an optical fiber;
(b) placing the ball between a first clamping block and a second clamping block;
(c) coupling together the first and second clamping blocks on a first side and a second side of the optical axis with a fastening mechanism, wherein the ball is held between the first and second clamping blocks, wherein the ball remains moveable; and
(d) aligning the optical component to the optical fiber by moving the ball.

* * * * *